(12) United States Patent
Cho (10) Patent No.: US 6,519,334 B1
(45) Date of Patent: Feb. 11, 2003

(54) METHOD FOR PROCESSING INCOMING CALL IN EXCHANGE SYSTEM

(75) Inventor: Seung-Hwan Cho, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/222,671

(22) Filed: Dec. 29, 1998

(30) Foreign Application Priority Data

Dec. 29, 1997 (KR) .............................. 97-76035

(51) Int. Cl.[7] .............................................. H04M 3/46
(52) U.S. Cl. ................ 379/211.03; 379/211.04; 379/214.01; 379/142.07; 379/164; 379/207.1
(58) Field of Search .................. 379/252, 258, 379/211.03, 396

(56) References Cited

U.S. PATENT DOCUMENTS 4,382,163 A  5/1983 White et al. ........... 379/376.01
4,436,962 A * 3/1984 Davis et al. ........... 379/207.03
4,821,314 A  4/1989 Guyader ..................... 379/162
5,309,028 A * 5/1994 Brown et al. ............... 370/264

OTHER PUBLICATIONS

Telrad Family of Digital Systems Adminstration Manual, Telrad Telecommunications, Inc., Feb., 1997.*

* cited by examiner

Primary Examiner—Forester W. Isen
Assistant Examiner—Daniel Swerdlow
(74) Attorney, Agent, or Firm—Robert E. Bushnell, Esq.

(57) ABSTRACT

An exchange system minimizing ring noises generated when processing an incoming call. Upon receipt of an incoming call from a central office line, the exchange system generates a ring to a called extension telephone to which the incoming call is terminated. Thereafter, it is determined whether there is an extension telephone designating a phone number of the called extension telephone. If there is the extension telephone designating the phone number of the called extension telephone, the exchange turns on/off a lamp prepared in the extension telephone or generates a ring to the above extension telephone, after an elapse of a predetermined time.

20 Claims, 7 Drawing Sheets

| BUTTON TYPE | RING/LAMP STATUS | TIME (SEC) | COMMENTS |
|---|---|---|---|
| INCOMING CALL BUTTON | 0 | 1 | GENERATE RING AFTER ELAPSE OF 1 SEC |
| | 1 | 1 | TURN ON/OFF LAMP AFTER ELAPSE OF 1 SEC |
| | 2 | 1 | GENERATE RING AND TURN ON/OFF LAMP AFTER ELAPSE OF 1 SEC |
| | 2 | 0 | GENERATE RING AND TURN ON/OFF LAMP WITHOUT DELAY |

FIG.5

| TYPE_BTN | CALL BUTTON | |
|---|---|---|
| RING_LAMP | 0 | |
| TIME | 2 | |
| TEL. NO. | 201 | 1F |

BUTTON #3 OF EXTENSION TEL. 202

| | CALL BUTTON | |
|---|---|---|
| | 2 | |
| | 5 | |
| | 201 | 1F |

BUTTON #4 OF EXTENSION TEL. 203

METHOD FOR PROCESSING INCOMING CALL IN EXCHANGE SYSTEM

CLAIM OF PRIORITY

This application makes reference to, incorporates the same herein, and claims all benefits accruing under 35 U.S.C. §119 from an application entitled METHOD FOR PROCESSING AN INCOMING CALL IN BRANCH EXCHANGE SYSTEM earlier filed in the Korean Industrial Property Office on Dec. 29, 1997, and there duly assigned Serial No. 97-76035, a copy of which is annexed hereto.

BACKGROUND OF THE INVENTION

1. Technical Field

The present invention relates to a call processing method in an exchange system, and more particularly, to a method for processing an incoming call in which a called extension telephone generates a ring and then other associated extensions generate a ring or turn on a lamp or both.

2. Related Art

An exchange system, such as a private automatic branch exchange (PABX) or a key telephone system, is connected to a telephone office through a central office (CO) line and accommodates a plurality of (internal) subscribers. The exchange system provides incoming and outgoing call services to the subscribers connected thereto through extension lines. During the incoming call service, the exchange system generates a ring to a called extension telephone, so as to notify receipt of the incoming call to the subscriber. In general, the exchange system generates the ring to only the called extension telephone.

However, an improved exchange system providing various convenient services generates the ring not only to the called extension telephone but also to the other extension telephones in a specified subscriber group to which the above called extension telephone belongs. In addition, when the called extension telephone does not answer the incoming call, the exchange system transfers, or forwards, the incoming call to the other extension telephones.

A method for generating a ring to all the extension telephones belonging to a specified subscriber group upon receipt of an incoming call is disclosed in Korean patent application No. 35448/1996, filed Aug. 24, 1996 and entitled "Method for Providing Ring Services by Subscriber Groups in Exchange System." In the prior method, the extension telephones are classified into several subscriber groups, and the extension telephones belonging to a specified subscriber group simultaneously generate the rings upon receipt of the incoming call. For example, assuming that the extension telephones having the extension phone numbers 201, 202, and 203, respectively, are classified into the same subscriber group, when the extension telephone having the phone number 201 receives the incoming call, not only the called extension telephone having the phone number 201 but also the other extension telephones having the extension phone numbers 202 and 203 generate the rings simultaneously. In addition, the extension telephones with the phone numbers 201, 202, and 203 may turn on/off the corresponding lamps to notify receipt of the incoming call. However, in the prior method, the subscribers of the extension telephones with the phone numbers 202 and 203 may answer the incoming call before the subscriber of the called extension telephone with the phone number 201 answers the incoming call. In such a case, the subscribers of the extension telephones with the phone numbers 202 and 203 should transfer the incoming call to the subscriber of the called extension telephone with the phone number 201, which gives the user inconvenience. Further, an office employing the prior exchange system may be noisy with the telephone rings, since all the extension telephones belonging to the same subscriber group generate the rings simultaneously.

An improved method for transferring the incoming call to another extension telephone when a called extension telephone does not answer the incoming call, is disclosed in Korean patent application No. 43712/1997, filed Aug. 30, 1997 and entitled "Method for Transferring Incoming Call." For example, when the called extension telephone having the extension phone number 201 does not answer the incoming call or is busy, the exchange system transfers the incoming call to the extension telephone with the phone number 202 and generates the ring to the above extension telephone, after an elapse of a specified time. When the extension telephone with the phone number 202 also does not answer the incoming call or is busy for a specified time, the exchange system then transfers the incoming call to the extension telephone with the phone number 203 and generates the ring to the extension telephone. Such a call transfer (or call forwarding) operation is performed based on a prescribed call transfer list. Even in the improved method, when the subscriber having the extension phone number 201 returns after the incoming call is transferred to the extension telephone with the phone number 202 during absence of the called subscriber, the subscriber having the extension phone number 202 should transfer the incoming call back to the called subscriber having the extension phone number 201, which is troublesome.

The simultaneous ring service and the call transfer service described above can be performed separately or together. Even in case the above two services are performed together, the above problems cannot be solved.

I have found that unnecessary noise due to ringing extension telephones in an office can be extremely inconvenient. Efforts have been made to improve telephone systems.

Exemplars of recent efforts in the art include U.S. Pat. No. 4,382,163 for MICROCOMPUTER CONTROLLED KEY TELEPHONE LINE CIRCUIT issued to White et al. and U.S. Pat. No. 4,821,314 for MESSAGE AND RINGING SIGNALING DEVICE FOR A TELEPHONE INSTALLATION issued to Guyader et al.

While these recent efforts provide advantages, I note that they fail to adequately provide a method for efficiently and conveniently reducing unnecessary noise due to ringing extension telephones in an office.

SUMMARY OF THE INVENTION

It is therefore an object of the present invention to provide a method for processing an incoming call in full consideration of the subscriber's circumstances, in an exchange system.

It is another object of the present invention to provide a method for minimizing telephone noises generated when processing an incoming call in an exchange system.

To achieve these and other objects in accordance with the principles of the present invention, as embodied and broadly described, the present invention provides a method for processing incoming calls in a telephone exchange system, wherein a user places an incoming call to a first extension number 201 while second and third extensions 202 and 203 are associated with first extension 201, such that when a multibutton telephone having the phone number 201 receives the incoming call from the central office line, the multibutton telephone with the phone number 202 generates the ring two seconds after the called multibutton telephone with the phone number 201 generates the ring. Subsequently, the multibutton telephone with the phone number 203 generates the ring and turns on/off the lamp for the associated button, five seconds after the called multibutton telephone with the phone number 201 started generating the ring.

To achieve these and other objects in accordance with the principles of the present invention, as embodied and broadly described, the present invention provides a method for processing incoming calls in a telephone exchange system, such that the exchange system can process the incoming call in full consideration of the subscriber's situations, based on data contained in a button information table and a call processing information table. As a result, the exchange system can get rid of the inconveniences which may be caused in transferring the incoming calls, and minimize generation of the ring noises.

To achieve the above objects, there is provided a method for processing an incoming call in an exchange system accommodating multibutton telephones, via extension lines, including buttons capable of designating phone numbers of extension telephones and lamps arranged in pair with the buttons. The multibutton telephones each generate a ring or turns on/off a lamp to notify receipt of the incoming call. The method includes the steps of determining whether a ring signal according to the incoming call from a central office line is detected or not; generating a ring to a called extension telephone; searching in sequence extension telephones having buttons designating a phone number of the called extension telephone; determining whether the extension telephones are set to generate the ring or turn on/off the lamp to notify receipt of the incoming call; and generating the ring or turning on/off the lamp to notify receipt of the incoming call according to a result of the above determining step.

To achieve these and other objects in accordance with the principles of the present invention, as embodied and broadly described, the present invention provides a method, comprising: when an incoming telephone call is received, generating a ring at a called extension telephone corresponding to a called extension subscriber to inform said called extension subscriber of said incoming call; detecting whether a second extension telephone corresponding to a second subscriber designates a phone number corresponding to said called extension telephone, said second extension telephone being other than said called extension telephone; and when said second extension telephone is detected, turning on and off a lamp of said second extension telephone to inform said second subscriber of said incoming call.

To achieve these and other objects in accordance with the principles of the present invention, as embodied and broadly described, the present invention provides a method, comprising: when an incoming telephone call is received, generating a first ring at a called extension telephone corresponding to a called extension subscriber to inform said called extension subscriber of said incoming call; detecting whether a second extension telephone corresponding to a second subscriber designates a phone number corresponding to said called extension telephone, said second extension telephone being other than said called extension telephone; and when said second extension telephone is detected, generating a second ring at said second extension telephone to inform said second subscriber of said incoming call.

To achieve these and other objects in accordance with the principles of the present invention, as embodied and broadly described, the present invention provides a method, comprising: producing an audible signal at a called extension telephone corresponding to a called extension subscriber to indicate an incoming telephone call, when said incoming call is received; detecting a plurality of additional extension telephones designating a phone number corresponding to said called extension telephone, said additional extension telephones corresponding to a respective plurality of additional extension subscribers, wherein said additional extension telephones include a first additional extension telephone corresponding to a first additional extension subscriber; determining whether said first additional extension telephone is configured to generate an audible signal at said first additional extension telephone to indicate said incoming call; sensing whether said first additional extension telephone is configured to turn on and off a lamp coupled to said first additional extension telephone to indicate said incoming call; generating said audible signal at said first additional extension telephone, when said first additional extension telephone is configured to generate said audible signal at said first additional extension telephone; and turning on and off said lamp coupled to said first additional extension telephone, when said first additional extension telephone is configured to turn on and off said lamp coupled to said first additional extension telephone.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to exemplify the principles of this invention.

DETAILED DESCRIPTION OF THE PREFERRED EMBODIMENT

A preferred embodiment of the present invention will be described in detail hereinbelow with reference to the accompanying drawings in which the like reference numerals denote the like and equivalent elements. In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the present invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

A telephone set in wide use today is known as a standard tone telephone set. The standard tone telephone set is a telephone set which uses a method called a dual tone multifrequency (DTMF) for sending a telephone number to a central office when placing a telephone call. The term "central office" refers to switching equipment that provides local exchange telephone service for a given geographical area, designated by the first three digits of a seven-digit telephone number in the United States of America. A local network is used to connect telephones in residences and businesses to central offices. Exchange area networks are disposed between local networks and long-distance networks.

The dual tone multifrequency (DTMF) method can only be utilized when the central office is equipped to process the dual tone multifrequency (DTMF) signals. Users have been replacing rotary dial telephone sets with standard tone telephone sets. Standard tone telephone sets include a push-button keypad for dialing. The push-button keypad has 12 keys, which represent the numbers 0 through 9 and the symbols * and #. Pressing one of these 12 keys causes an electronic circuit to generate two tones, each tone having a different frequencies. Hence the name dual tone multifrequency (DTMF).

There is a low frequency tone for each row of keys across the keypad and a high frequency for each column of keys down the keypad. Pressing key 7, for example, generates an 852 hertz tone and a 1,209 hertz tone. Pressing key 1, which is in the same column as key 7, generates a 697 hertz tone and the 1,209 hertz tone. Pressing key 9, which is in the same row as key 7, generates the 852 hertz tone and a 1,477 hertz tone. By using the dual tone method, 12 unique combinations are produced from only seven tones when the 12-position keypad is used.

Figure 1:
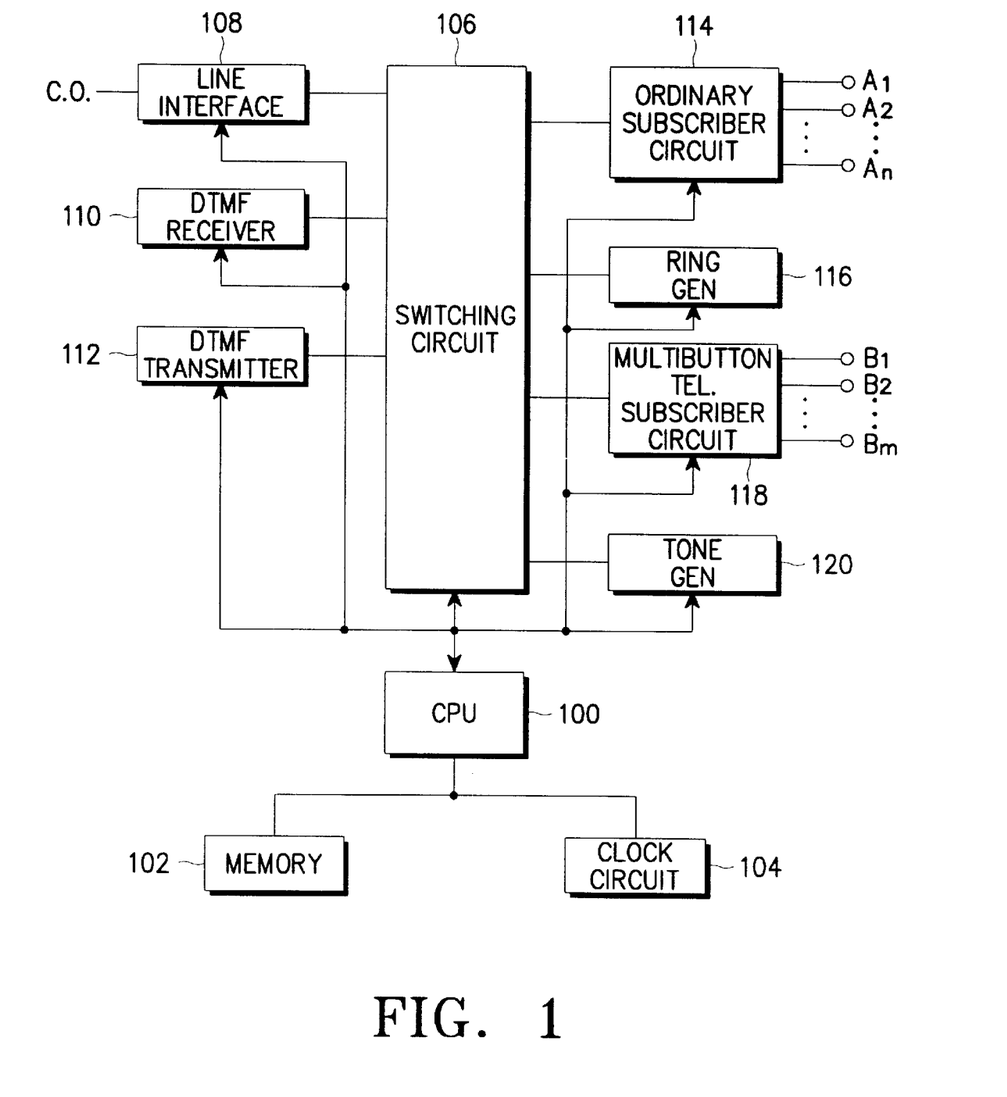
FIG. 1 is a block diagram of an exchange system to which the present invention is applicable.

Turn now to FIG. 1, which is a block diagram of an exchange system to which the present invention is applicable. First, it is to be noted that the embodiment of the present invention is applied to the exchange system of FIG. 1. Referring to FIG. 1, a central processing unit (CPU) 100 controls the overall operations of the exchange system to switch the incoming and outgoing calls and provide various services to the subscribers. A memory 102 stores a control program for the central processing unit 100 and initial service data, and temporarily stores the data processed in the central processing unit 100. The memory 102 consists of a read only memory (ROM) for storing the control program and the initial service data, and a random access memory (RAM) for temporarily storing the data generated during execution of the program. A clock circuit 104, being a clock chip, generates time information to the central processing unit 100. A switching circuit 106 switches various tones and voice data under the control of the central processing unit 100.

An ordinary subscriber circuit 114 provides a loop current, or speech current, to a plurality of ordinary telephones A1, A2, . . . and An, and interfaces signals between the ordinary telephones A1, A2, . . . and An and the switching circuit 106, under the control of the central processing unit 100. A ring generator 116 generates a ring signal and supplies the generated ring signal to subscriber lines. A multibutton telephone subscriber circuit 118 transmits and receives data to and from a plurality of multibutton telephones B1, B2, . . . , and Bm, supplies the loop current to the multibutton telephones B1, B2, . . . , and Bm, and interfaces signals between the multibutton telephones B1, B2, . . . , and Bm and the switching circuit 106, under the control of the central processing unit 100. Here, the ordinary telephones A1, A2, . . . , and An and the multibutton telephones B1, B2, . . . , and Bm are the extension telephones which are respectively connected to the ordinary telephone subscriber circuit 114 and the multibutton telephone subscriber circuit 118 via extension lines.

A tone generator 120 generates various tone signals and supplies the generated tone signals to the switching circuit 106, under the control of the central processing unit 100. A line interface, or office line circuit, 108 seizes a central office (CO) line to form a communication, or speech, loop and interfaces a signal between the central office line and the switching circuit 106, under the control of the central processing unit 100. Here, the central office line refers to a line connected between the exchange system of FIG. 1 and an exchange system in the central telephone office.

A dual tone multifrequency (DTMF) receiver 110 analyzes a dual tone multifrequency signal input from the switching circuit 106, converts the analyzed dual tone multifrequency signal to digital data and outputs the digital data to the central processing unit 100. Here, the dual tone multifrequency signal that the dual tone multifrequency receiver 110 has received via the switching circuit 106 may be a phone number dialed by an external subscriber or a phone number dialed by the extension subscriber. A dual tone multifrequency transmitter 112, also referred to as a dual tone multifrequency generator 112, converts digital data output from the central processing unit 100 to the dual tone multifrequency signal and outputs the dual tone multifrequency signal to the switching circuit 106.

Figure 4:
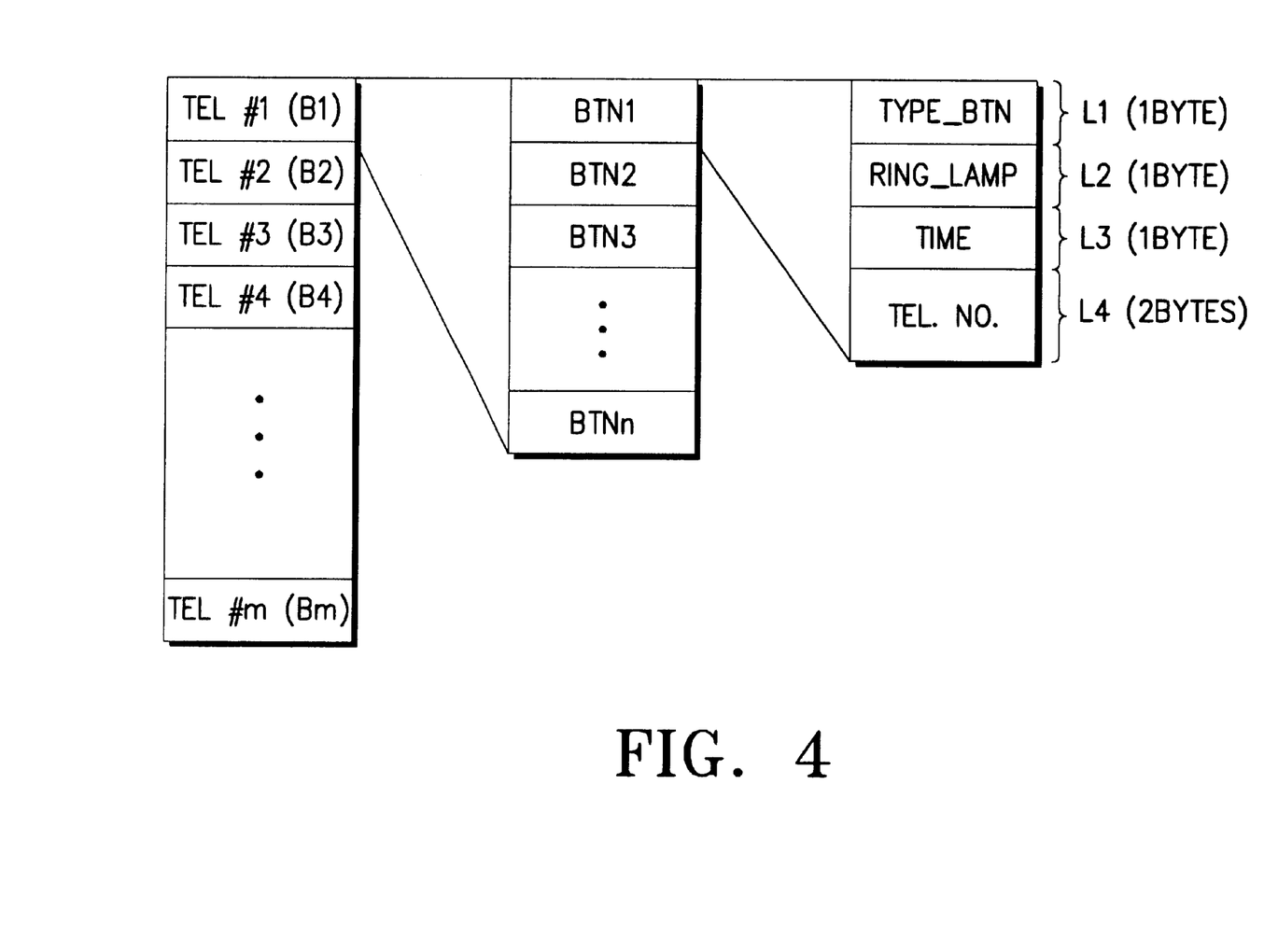
FIG. 4 is a diagram showing a button information table, in accordance with the principles of the present invention.
Figure 5:
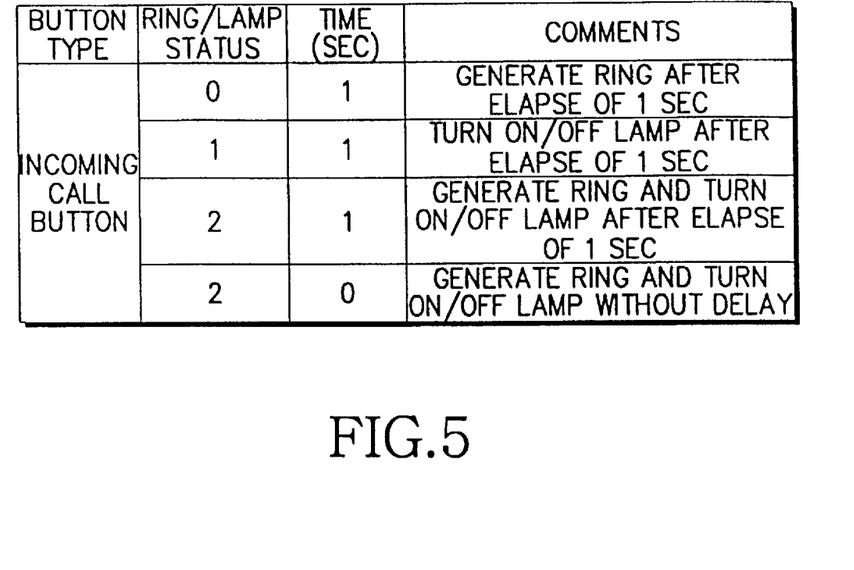
FIG. 5 is a diagram showing a call processing information table, in accordance with the principles of the present invention.

Although the common exchange system has been described heretofore with reference to FIG. 1, it should be noted that the read only memory (ROM) in the memory 102 according to the present invention has a button information table of FIG. 4 and a call processing information table of FIG. 5. In other words, the read only memory (ROM) in the memory 102 shown in FIG. 1 stores data corresponding to the information depicted in the table of FIG. 4 and the table of FIG. 5.

Figure 2:
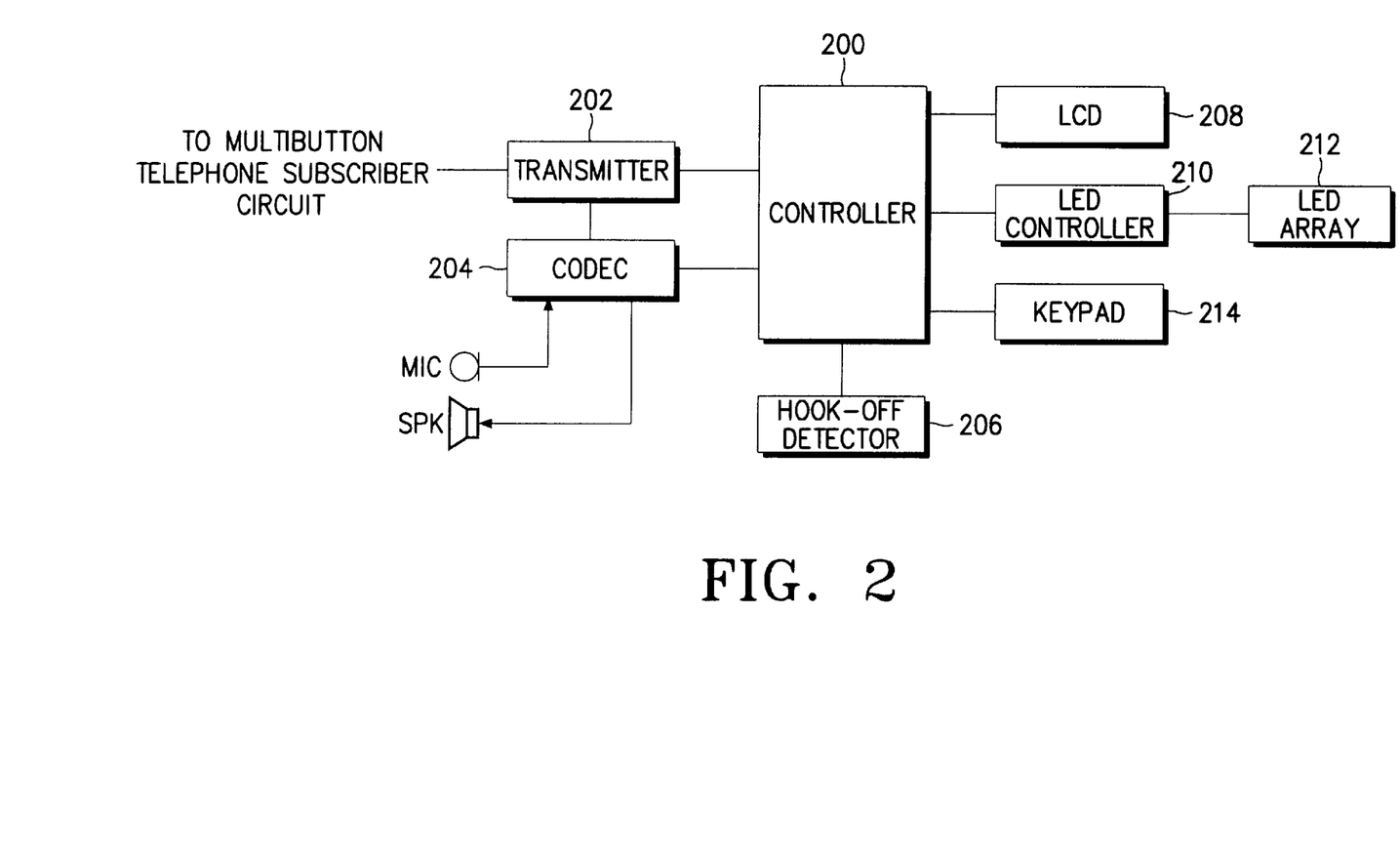
FIG. 2 is a block diagram of a multibutton telephone connected to the exchange system of FIG. 1, in accordance with the principles of the present invention.

Turn now to FIG. 2, which is a block diagram of a multibutton telephone connected to the exchange system of FIG. 1, in accordance with the principles of the present invention. FIG. 2 shows a block diagram of a multibutton telephone connected to the multibutton telephone subscriber circuit 118 of FIG. 1. The multibutton telephone refers to a telephone having a plurality of function buttons as well as dial buttons, that is, 0 through 9, * and # buttons. A digital telephone or a key telephone may be an example of the multibutton telephone. In the embodiment of the present invention, the function buttons have unique extension phone numbers assigned thereto. In the specification, the function button is called an incoming call button.

Referring to FIG. 2, a controller 200 controls the overall operations of the multibutton telephone to switch the calls and provide various services to the user. A transmitter 202 transmits and receives data to and from the exchange system of FIG. 1 under the control of the controller 200. A coder-decoder (CODEC) 204 converts voice data provided from the transmitter 202 to a voice signal and outputs the voice signal through a speaker SPK. Further, the coder-decoder 204 converts a voice signal provided from a microphone MIC to voice data and provides the voice data to the exchange system of FIG. 1 via the transmitter 202. Here, the microphone MIC and the speaker SPK refer to the mouthpiece and the earpiece of the multibutton telephone, respectively. However, in case the multibutton telephone employs a speaker-phone function, the microphone MIC and the speaker SPK refer to an auxiliary microphone and an auxiliary speaker, respectively. A hook-off detector 206 detects hook-off of the multibutton telephone and provides the controller 200 with the detected hook-off state. A liquid crystal display (LCD) 208 displays various information and a light emitting diode (LED) controller 210 turns on and off a light emitting diode (LED) array 212, under the control of the controller 200. In the embodiment, the light emitting diode (LED) array 212 consists of a plurality of light emitting diodes (LEDs) each being arranged in pair with the incoming call buttons, for indicating receipt of the incoming call. A keypad 214 includes the dial buttons, that is, 0 through 9, * and # buttons, and the function buttons, that is, the incoming call buttons.

The liquid crystal display 208 can be replaced with a cathode ray tube, a gas-plasma display, a light emitting diode display, an electro-luminescent display, a field emission display, or other type of video display conveying varying visual information to a user. Similarly, the light emitting diode array 212 can be replaced with another form of visual alert unit such as a cathode ray tube, a gas-plasma display, a liquid crystal display, an electro-luminescent display, a field emission display, or other device.

Figure 3:
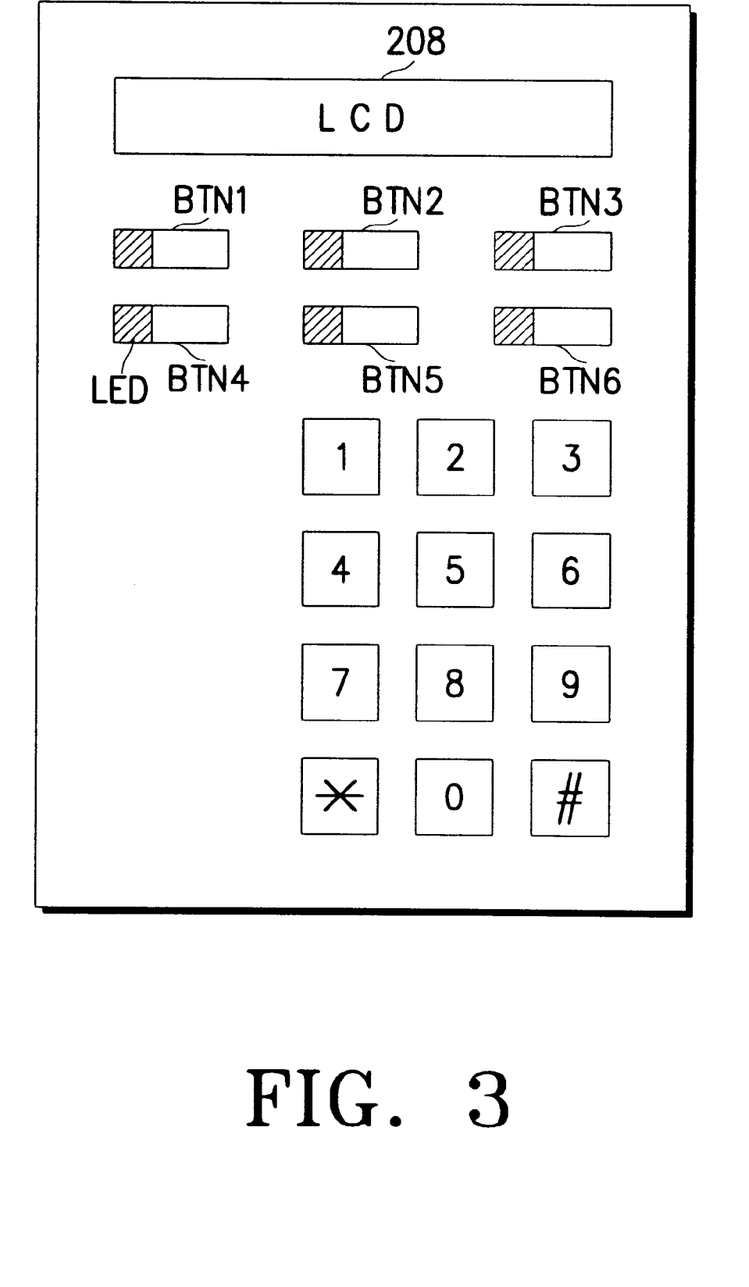
FIG. 3 is a diagram showing the button arrangement of the multibutton telephone to which the present invention is applicable.

Turn now to FIG. 3, which is a diagram showing the button arrangement of the multibutton telephone to which the present invention is applicable. FIG. 3 shows the exterior of the multibutton telephone of FIG. 2, wherein the liquid crystal display 208, the dial buttons 0 to 9, * and # buttons and the incoming call buttons BTN1–BTN6 are arranged as illustrated. Here, the incoming call buttons BTN1–BTN6 have the unique extension phone numbers assigned thereto, and are arranged in pair with the corresponding light emitting diodes.

Turn now to FIG. 4, which is a diagram showing a button information table, in accordance with the principles of the present invention. As mentioned above, the button information table is stored in the read only memory (ROM) of the memory 102. For processing the incoming calls according to the present invention, the unique phone numbers for the extension telephones should be designated to the incoming call buttons BTN1–BTN6.

Referring to FIG. 4, a total of m multibutton telephones, denoted by B1, B2, . . . , and Bm, are connected to the multibutton telephone subscriber circuit 118 of the exchange system. Each of the multibutton telephone includes a total of n function buttons, denoted by BTN1, BTN2, BTN3, . . . , and BNTn, which can be designated for the incoming call buttons according to the present invention. Whether or not the function buttons BTN1, BTN2, BTN3, . . . , and BNTn can be designated for the incoming call buttons, and how to notify receipt of the call incoming from the central office line, can be determined by registering appropriate information in the four storage areas L1, L2, L3, and L4 allocated to each one of the respective function buttons. In the embodiment, a first storage area L1 stores button type information TYPE_BTN determining whether to designate the function button for the incoming call button or not. It is assumed that the first storage area L1 stores the button type information TYPE_BTN designating the function button for the incoming call button. A second storage area L2 stores information determining whether to generate the ring or turn on or off the lamp, that is, the light emitting diode, in order to notify the subscriber of the multibutton telephone that the incoming call to the called extension telephone is received. A third storage area L3 stores information determining the time delay in generating the ring or turning on or off the lamp of the multibutton telephone after receipt of the incoming call. A fourth storage area L4 stores the phone number for the designated extension telephone. The first to third storage areas L1, L2, and L3 consist of 1 byte, respectively, and the fourth storage area L4 consists of 2 bytes.

Turn now to FIG. 5, which is a diagram showing a call processing information table, in accordance with the principles of the present invention. FIG. 5 shows a call processing information table according to an embodiment of the present invention, by way of example. This call processing information table is also stored in the read only memory (ROM) of the memory 102. Referring to FIG. 5, when a ring/lamp status is set to "0", the multibutton telephone generates the ring, and when the ring/lamp status is set to "1", the multibutton telephone turns on/off the lamp. Further, when the ring/lamp status is set to "2", the multibutton telephone generates the ring and turns on/off the lamp. In addition, a term "time" in FIG. 5 represents the time delay in generating the ring or turning on/off the lamp after receipt of the incoming call.

In FIG. 5, when the ring/lamp status value is set to "0" and the time value is set to "1", the multibutton telephone generates the ring one second after the called extension telephone corresponding to the designated incoming call button generates the ring upon receipt of the incoming call. When the ring/lamp status value and the time value are both set to "1", the multibutton telephone turns on/off the corresponding lamp one second after the called extension telephone generates the ring upon receipt of the incoming call. When the ring/lamp status value is set to "2" and the time value is set to "1", the multibutton telephone generates the ring and turns on/off the corresponding lamp one second after the called extension telephone generates the ring upon receipt of the incoming call. Finally, when the ring/lamp status value is set to "2" and the time value is set to "0", the multibutton telephone generates the ring and turns on/off the corresponding lamp at the time when the called extension telephone generates the ring upon receipt of the incoming call.

Figure 6A:
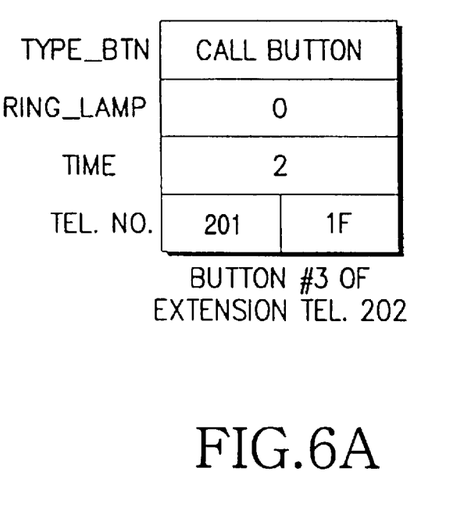
FIGS. 6A and 6B are diagrams showing an example of button information tables having call processing information, in accordance with the principles of the present invention.
Figure 6B:
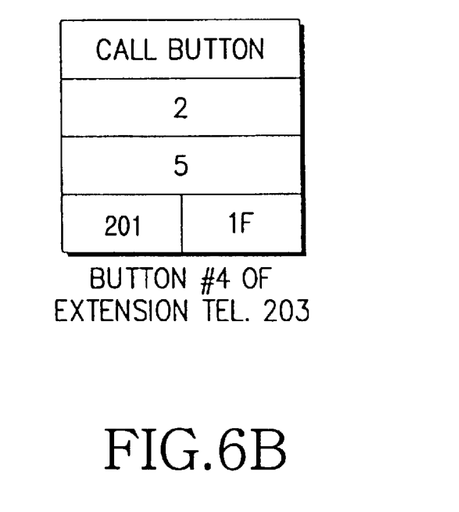

Turn now to FIGS. 6A and 6B, which are diagrams showing an example of button information tables having call processing information, in accordance with the principles of the present invention. In the multibutton telephone with the extension phone number 202, the third function button BTN3 is designated for the incoming call button. See FIG. 6A. In the multibutton telephone with the extension phone number 203, the fourth function button BTN4 is assigned to the incoming call button. See FIG. 6B. Here, it is assumed that the first storage areas L1 of FIGS. 6A and 6B store the button type information TYPE_BTN designating the function buttons to the incoming call buttons, and the incoming call buttons BTN3 and BTN4 both designate the extension telephone with the phone number 201. The second storage areas L2 of FIGS. 6A and 6B store the ring/lamp status of "0" and "2", respectively. Further, the third storage areas L3 of FIGS. 6A and 6B store the time values of "2" and "5", respectively.

As a result, when the multibutton telephone having the phone number 201 receives the incoming call from the central office line, the multibutton telephone with the phone number 202 generates the ring two seconds after the called multibutton telephone with the phone number 201 generates the ring. Subsequently, the multibutton telephone with the phone number 203 generates the ring and turns on/off the lamp for the fourth button BTN4, five seconds after the called multibutton telephone with the phone number 201 started generating the ring.

An operator of the exchange system can input the information to the button information table and the call processing information table through a man-machine-interface (MMI). Therefore, the exchange system can process the incoming call in full consideration of the subscriber's situations, based on the button information table and the call processing information table. As a result, the exchange system can get rid of the inconveniences which may be caused in transferring the incoming calls, and minimize generation of the ring noises.

In a first embodiment of the present invention, when the multibutton telephone with the phone number 201 generates the ring upon receipt of the incoming call, the multibutton telephones with the phone numbers 202 and 203, having the incoming call buttons designating the multibutton telephone with the phone number 201, turn on/off the lamps with a specified time difference, instead of generating the rings, so as to contribute to formation of the silent office environments. To do so, for example, the ring/lamp status values of the multibutton telephones with the phone numbers 202 and 203 are set to "1", the time value of the multibutton telephone with the phone number 202 is set to "2", and the time value of the multibutton telephone with the phone number 203 is set to "5".

In a second embodiment of the present invention, when the multibutton telephone with the phone number 201 generates the ring upon receipt of the incoming call, the multibutton telephones with the phone numbers 202 and 203, having the incoming call buttons designating the multibutton telephone with the phone number 201, generates the rings with the time difference, so as to contribute to formation of the silent office environments. To do so, for example, the ring/lamp status of the multibutton telephones with the phone numbers 202 and 203 are set to "0", the time value of the multibutton telephone with the phone number 202 is set to "2", and the time value of the multibutton telephone with the phone number 203 is set to "5".

Figure 7A:
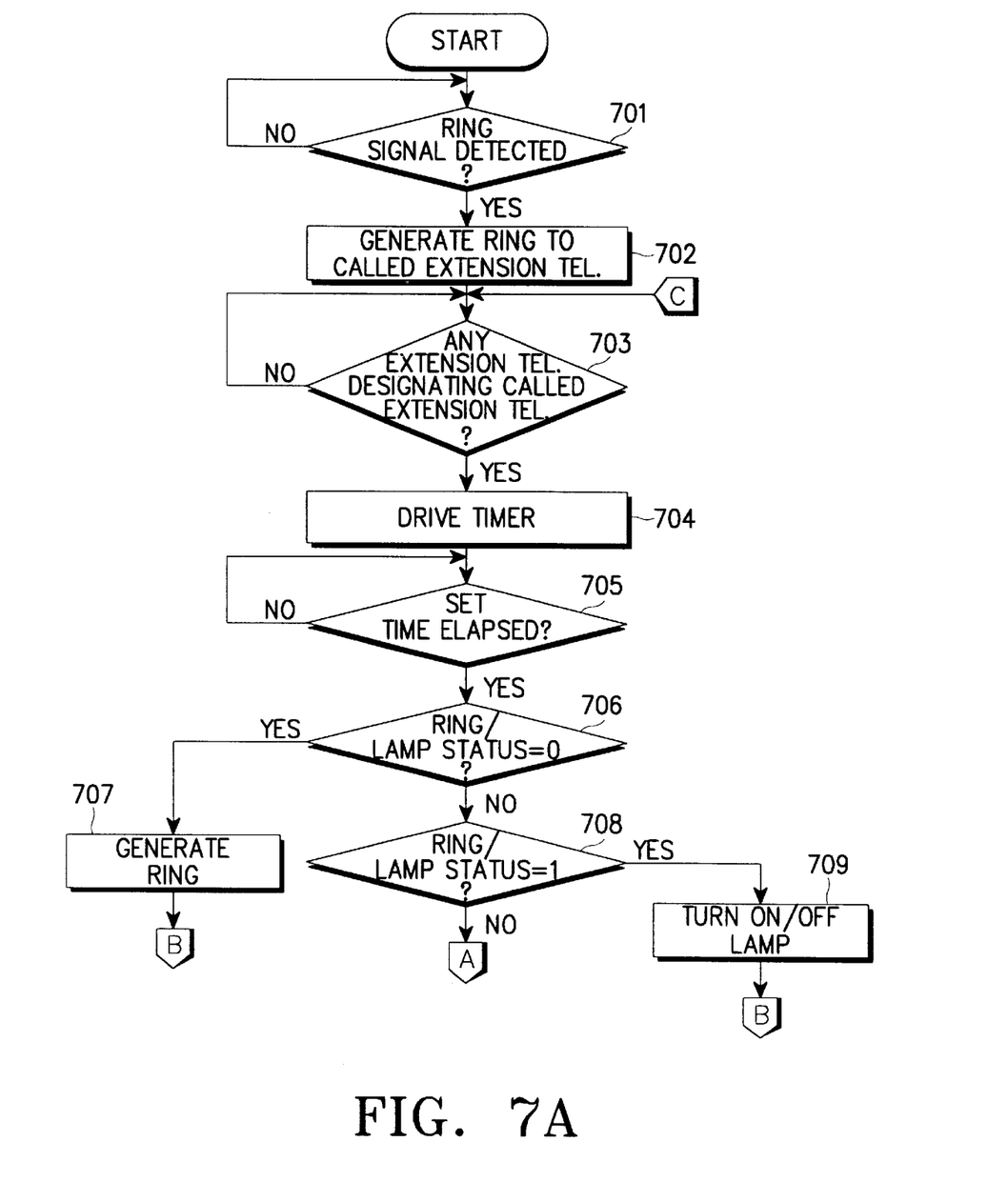
FIGS. 7A and 7B are flowcharts showing the procedure for processing the incoming call, in accordance with the principles of the present invention.
Figure 7B:
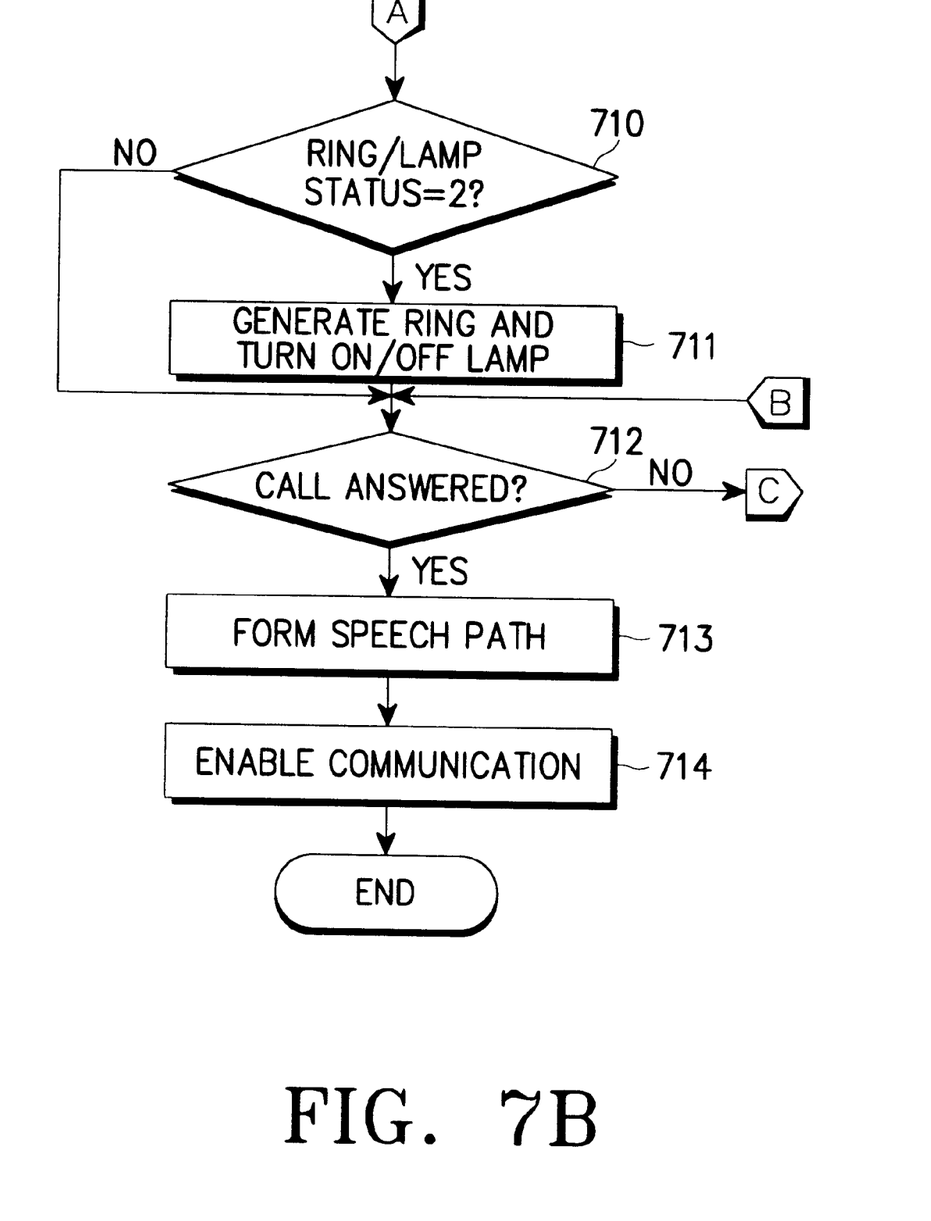

Turn now to FIGS. 7A and 7B, which are flowcharts showing the procedure for processing the incoming call, in accordance with the principles of the present invention. The program is stored in the read only memory (ROM) of the memory 102.

Assume that the incoming call is terminated to the multibutton telephone with the phone number 201, and the above called multibutton telephone is designated by the third button BTN3 of the multibutton telephone with the phone number 202 and the fourth button BTN4 of the multibutton telephones with the phone number 203. Further, the third button BTN3 of the multibutton telephone with the phone number 202 has the call processing information as shown in FIG. 6A, and the fourth button BTN4 of the multibutton telephone with the phone number 203 has the call processing information as shown in FIG. 6B.

Refer now to FIGS. 7A and 7B. At step 701, the central processing unit 100 detects the incoming call from the central office line through the line interface 108. At step 702, the central processing unit 100 generates a ring to the called multibutton telephone with the phone number 201 by controlling the ring generator 116. At step 703, the central processing unit 100 reads the information stored in the button information table of the memory 102 and determines whether there is an extension multibutton telephone having the incoming call button designating the called multibutton telephone with the phone number 201. At step 704, the central processing unit 100 drives a timer using the clock circuit 104. At step 705, the central processing unit 100 determines whether a predetermined time, that is, 2 seconds, has elapsed or not. At step 704, the central processing unit 100 drives the timer by using the time value stored in the button information table. In this case, since the time value is set to 2 seconds, the timer will be driven for two seconds.

Step 706 is performed after step 705. At step 706, the central processing unit 100 reads the ring/lamp status value stored in the call processing information table for the third button BTN3 of the multibutton telephone with the phone number 202, and then determines whether the ring/lamp status value is set to "0". At step 707, a ring is generated if the ring/lamp status is detected to be "0" at step 706. In other words, if it is determined that the ring/lamp status value is set to "0", the central processing unit 100 generates the ring to the multibutton telephone with the phone number 202 by using the ring generator 116 in step 707. The step 708 is performed when the ring/lamp status is not detected to be "0" at step 706.

At step 708, the central processing unit 100 reads the ring/lamp status value stored in the call processing information table for the third button BTN3 of the multibutton telephone with the phone number 202, and then determines whether the ring/lamp status value is set to "1". At step 709, a lamp is turned on/off if the ring/lamp status is detected to be "1" at step 708. In other words, if it is determined that the ring/lamp status value is set to "1", the central processing unit 100 turns on/off the lamp for the third button BTN3 of the multibutton telephone with the phone number 202 in step 709. The step 710 is performed when the ring/lamp status is not detected to be "1" at step 708.

At step 710, the central processing unit 100 reads the ring/lamp status value stored in the call processing information table for the third button BTN3 of the multibutton telephone with the phone number 202, and then determines whether the ring/lamp status value is set to "2". At step 711, a lamp is turned on/off, and a ring is generated, when the ring/lamp status is detected to be "2" at step 710. In other words, if it is determined that the ring/lamp status value is set to "2", the central processing unit 100 generates the ring to the multibutton telephone with the phone number 202 and turns on/off the lamp for the third button BTN3 of the above multibutton telephone, in step 711. The step 710 is performed when the ring/lamp status is not detected to be "1" at step 708.

In practice, since it is assumed the ring/lamp status value for the third button BTN3 of the multibutton telephone with the phone number 202 is set to "0", the central processing unit 100 generates the ring to the multibutton telephone with the phone number 202 in the step 707 so as to notify that the incoming call is terminated to the multibutton telephone with the phone number 201. Here, the multibutton telephone with the phone number 202 generates the ring, together with the multibutton telephone with the phone number 201, two seconds after the multibutton telephone with the phone number 201 started generating the ring.

At step 712, when the sound of the telephone ring occurs, if the subscriber of the multibutton telephone with the phone number 202 answers the incoming call, the central processing unit 100 detects the call answering state. In other words, at step 712 the central processing unit 100 detects whether the call was answered.

At step 713, thereafter, the central processing unit 100 controls the switching circuit 106 to form the speech path between the central office line and the call answered multibutton telephone with the phone number 202. At step 714, the central processing unit 100 enables the communication between the central office line and the call answered multibutton telephone with the phone number 202.

In the meantime, when the subscriber of the multibutton telephone with the phone number 202 does not answer the incoming call in the step 712, the central processing unit 100 returns to the step 703 and repeats the above procedure.

Returning to the step 703, the central processing unit 100 reads the information stored in the button information table to determine whether there is another extension telephone designating the called multibutton telephone with the phone number 201. In the embodiment, the multibutton telephone with the phone number 203 is determined as another extension telephone designating the called extension telephone with the phone number 201.

After the step 703, the central processing unit 100 drives the timer by using the clock circuit 104 in step 704 and determines in step 705 whether the predetermined time, that is, 5 seconds, has elapsed or not. In the step 704, the central processing unit 100 drives the timer by using the time value stored in the button information table. In this case, since the time value is set to 5 seconds, the timer will be driven for five seconds.

After an elapse of the predetermined time, the central processing unit 100 reads the ring/lamp status value stored in the call processing information table for the fourth button BTN4 of the multibutton telephone with the phone number 203, determines in steps 706, 708 and 710 whether the ring/lamp status value is set to "0", "1" or "2", respectively.

In practice, since it is assumed the ring/lamp status value for the fourth button BTN4 of the multibutton telephone with the phone number 203 is set to "2", the central processing unit 100 generates in step 711 the ring to the multibutton telephone with the phone number 203 and turns on/off the lamp for the forth button BTN4 of the above multibutton telephone.

At the sound of the telephone ring and the sight of the blinking lamp, if the subscriber of the multibutton telephone with the phone number 203 answers the incoming call, the central processing unit 100 detects the call answering state in step 712. Thereafter, the central processing unit 100 controls in step 713 the switching circuit 106 to form the speech path between the central office line and the call answered multibutton telephone with the phone number 203, and enables the communication therebetween in step 714.

The procedure of the steps 703 through 712 can be performed for all the multibutton telephones having the incoming call buttons designating the phone number of the called extension telephone. In the embodiment, since two multibutton telephones with the phone numbers 202 and 203 have the incoming call buttons designating the called extension telephone with the phone number 201, the procedure is performed twice. During repetition of the procedure, if one of the subscribers of the multibutton telephones answers the incoming call, the central processing unit 100 ends the call processing procedure after performing the steps 713 and 714.

As described above, the exchange system of the invention can process the incoming call in full consideration of the subscriber's situations, based on the button information table and the call processing information table which can be managed by the operator. Therefore, the exchange system can get rid of the inconvenience which may be caused in transferring the incoming calls and minimize the telephone noises, thereby contributing to formation of the silent office environments.

The foregoing paragraphs describe the details of a call processing method in an exchange system, and more particularly to a method for processing an incoming call, in which a called extension telephone generates a ring upon receipt of an incoming call and subsequently the other extension telephones designating the above called extension telephone also generate the rings and turn on/off lamps prepared therein.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method, comprising:

when an incoming telephone call is received, generating a first audible ring at a called extension telephone;

reading data stored in a button information table of a memory of an exchange system, the button information table storing at least three items of data corresponding to each respective one button of a plurality of buttons, said plurality of buttons being located on different telephones of a plurality of additional extension telephones, said plurality of additional extension telephones and said called extension telephone being connected to said exchange system, the at least three items of data including ring/lamp data, time delay data, and designated phone number;

when the data read from the button information table identifies at least one particular button designating the first phone number corresponding to said called extension telephone, with the data read from the button information table indicating that said one particular button has predetermined time delay data, driving a timer for a time period corresponding to the predetermined time delay data, said one particular button being located on a first telephone selected from among said plurality of additional extension telephones, the data in the button information table further indicating that said one particular button has predetermined ring/lamp data, the predetermined ring/lamp data corresponding to one function selected from among generate a second audible ring at said first telephone, turn a lamp on-and-off on said first telephone, and generate the second audible ring at said first telephone and turn said lamp on-and-off together, said lamp corresponding to said one particular button; and when the time period elapses and said called extension telephone has not been answered, performing said one function corresponding to the predetermined ring/lamp data.

2. The method of claim 1, said driving of said timer and said performing of said one function corresponding to the predetermined ring/lamp data being conducted only when the data read from the button information table indicates that said one particular button has an incoming call button function.

3. The method of claim 1, said driving of said timer being performed by a central processing unit of said exchange system using a clock circuit connected to said central processing unit.

4. The method of claim 3, said reading, driving, and performing being repeated when said first telephone is not answered.

5. The method of claim 4, further comprising:
forming a speech path between a calling telephone and said called extension telephone when said called extension telephone is answered before the time period elapses.

6. The method of claim 5, further comprising receiving said incoming call from a central office line.

7. The method of claim 5, further comprising receiving said incoming call from a central office line coupled with a central office exchange to a switchboard of said exchange system.

8. The method of claim 7, further comprising:
when the data read from the button information table identifies at least a second particular button designating the first phone number corresponding to said called extension telephone, with the data read from the button information table indicating that said second particular button has second predetermined time delay data, detecting when a second time period elapses, the second time period corresponding to the second predetermined time delay data, the second time period being longer than the first time period, said second particular button being located on a second telephone selected from among said plurality of additional extension telephones, the data in the button information table further indicating that said second particular button has second predetermined ring/lamp data, the second predetermined ring/lamp data corresponding to one function selected from among generate a third audible ring at said second telephone, turn a second lamp on-and-off on said second telephone, and generate the third audible ring at said second telephone and turn said second lamp on-and-off together, said second lamp corresponding to said second particular button; and when the second time period elapses and said first telephone has not been answered, performing said one function corresponding to the second predetermined ring/lamp data.

9. A method, comprising:
when an incoming telephone call is received, generating a first audible ring at a called extension telephone;

reading data stored in a button information table of a memory of an exchange system, the button information table storing at least four items of data corresponding to each respective one button of a plurality of buttons, said plurality of buttons being located on different telephones of a plurality of additional extension telephones, said plurality of additional extension telephones and said called extension telephone being connected to said exchange system, the at least four items of data including button function, ring/lamp data, time delay data, and designated phone number, the data stored in the button information table including data showing that at least a first particular button designates the first phone number corresponding to said called extension telephone, and showing that said first particular button has an incoming call button function and first predetermined time delay data, the data stored in the button information table further including data showing that at least a second particular button designates the first phone number corresponding to said called extension telephone, and showing that said second particular button has an incoming call button function and second predetermined time delay data, the first predetermined time delay data corresponding to a first time period, the second predetermined time delay data corresponding to a second time period longer than the first time period, said first particular button being located on a first telephone selected from among said plurality of additional extension telephones, the data in the button information table further showing that said first particular button has first predetermined ring/lamp data, the first predetermined ring/lamp data corresponding to one function selected from among generating a second audible ring at said first telephone, turning a second lamp on-and-off on said first telephone, and generating the second audible ring at said first telephone and turning said second lamp on-and-off together, said second lamp corresponding to said first particular button, said second particular button being located on a second telephone selected from among said plurality of additional extension telephones not including said first telephone, the data in the button information table further showing that said second particular button has second predetermined ring/lamp data, the second predetermined ring/lamp data corresponding to one function selected from among generating a third audible ring at said second telephone, turning a third lamp on-and-off on said second telephone, and generating the third audible ring at said second telephone and turning said third lamp on-and-off together, said third lamp corresponding to said second particular button;

identifying when the first time period elapses;

when the first time period elapses and said called extension telephone has not been answered, performing said one function corresponding to the first predetermined ring/lamp data;

determining when the second time period elapses; and when the second time period elapses and said first telephone has not been answered, conducting said one function corresponding to the second predetermined ring/lamp data.

10. The method of claim 9, said conducting of said one function corresponding to the second predetermined ring/lamp data being performed only when said first telephone was not answered before the second period elapsed and when said called extension telephone was not answered before the first time period elapsed.

11. The method of claim 10, said reading being repeated when said second telephone is not answered before the second time period elapses.

12. The method of claim 11, the data stored in the button information table further including data showing that at least a third particular button designates the first phone number corresponding to said called extension telephone.

13. The method of claim 9, the data stored in the button information table further including data showing that at least a third particular button designates the first phone number corresponding to said called extension telephone.

14. The method of claim 12, further comprising receiving said incoming call from a central office line.

15. The method of claim 12, further comprising receiving said incoming call from a central office line coupled with a central office exchange to a switchboard of said exchange system.

16. The method of claim 12, wherein said method comprises a processing of said incoming call within said exchange system.

17. A method, comprising:
  producing a first audible signal at a called extension telephone corresponding to a called extension subscriber to indicate an incoming telephone call, when said incoming call is received;
  reading data stored in a button information table of a memory of an exchange system, the button information table storing at least three items of data corresponding to each respective one button of a plurality of buttons, said plurality of buttons being located on different telephones of a plurality of additional extension telephones, said plurality of additional extension telephones and said called extension telephone being connected to said exchange system, the at least three items of data including ring/lamp data, time delay data, and designated phone number;
  in dependence upon said reading of the data, detecting at least one particular button on at least a first additional extension telephone selected from among said plurality of additional extension telephones, said at least one particular button designating a phone number corresponding to said called extension telephone;
  in dependence upon the ring/lamp data corresponding to said at least one particular button, determining whether said first additional extension telephone is configured to generate a second audible signal at said first additional extension telephone to indicate said incoming call;
  in dependence upon the ring/lamp data corresponding to said at least one particular button, sensing whether said first additional extension telephone is configured to turn on and off a lamp coupled to said first additional extension telephone to indicate said incoming call;
  in dependence upon the time delay data corresponding to said at least one particular button, generating the second audible signal at said first additional extension telephone, when said first additional extension telephone is configured to generate the second audible signal at said first additional extension telephone and said called extension telephone is not answered during a time period corresponding to the time delay data; and
  in dependence upon the time delay data corresponding to said at least one particular button, turning on and off said lamp coupled to said first additional extension telephone, when said first additional extension telephone is configured to turn on and off said lamp coupled to said first additional extension telephone and said called extension telephone is not answered during a time period corresponding to the time delay data.

18. The method of claim 17, said generating of the second audible signal and said turning on and off of said lamp being performed substantially simultaneously when said first additional extension telephone is configured to generate the second audible signal and is configured to turn on and off said lamp.

19. The method of claim 18, the data stored in the button information table further including data showing that at least a second particular button designates the first phone number corresponding to said called extension telephone.

20. The method of claim 18, said called extension telephone and said plurality of additional extension telephones corresponding to multibutton telephones including buttons capable of designating phone numbers and including light emitting units arranged to correspond to said buttons, said incoming call being received from a central office line coupled with a central office exchange, said incoming call being received at a switchboard of said exchange system, said called extension telephone and said additional extension telephones being coupled to said exchange system, wherein said lamp coupled to said first additional extension telephone corresponds to one of said light emitting units.

* * * * *